United States Patent [19]

Toda et al.

[11] Patent Number: 5,272,913

[45] Date of Patent: Dec. 28, 1993

[54] CANTILEVER FOR A SCANNING PROBE MICROSCOPE AND A METHOD OF MANUFACTURING THE SAME

[75] Inventors: Akitoshi Toda, Kunitachi; Kaoru Tadokoro, Hachioji; Yasuji Nagata, Hachioji; Etsuo Shinohara, Hachioji; Yoshimitsu Enomoto, Tokyo; Michio Takayama, Tatsuno; Ryo Ohta, Ina, all of Japan

[73] Assignee: Olympus Optical Co., Ltd., Tokyo, Japan

[21] Appl. No.: 724,146

[22] Filed: Jul. 1, 1991

[30] Foreign Application Priority Data

Aug. 31, 1990 [JP] Japan .................. 2-228009
May 27, 1991 [JP] Japan .................. 3-121080

[51] Int. Cl.$^5$ ............................................. G01B 5/28
[52] U.S. Cl. ............................................. 73/105
[58] Field of Search ................... 73/105, 81–85; 250/306; 33/559, 560, 561

[56] References Cited

U.S. PATENT DOCUMENTS

| | | | |
|---|---|---|---|
| 3,693,417 | 9/1972 | Fritz et al. | 73/81 |
| 4,574,625 | 3/1986 | Olasz et al. | 73/105 |
| 4,916,002 | 4/1990 | Carver . | |
| 4,943,719 | 7/1990 | Akamine et al. . | |
| 5,051,379 | 9/1991 | Bayer et al. | 250/306 |
| 5,085,070 | 2/1992 | Miller et al. | 73/105 |
| 5,132,533 | 7/1992 | Kawase et al. | 250/306 |

FOREIGN PATENT DOCUMENTS

| | | | |
|---|---|---|---|
| 62-130302 | 6/1987 | Japan . | |
| 1597687 | 10/1990 | U.S.S.R. | 73/81 |
| 0760828 | 11/1956 | United Kingdom | 73/81 |

OTHER PUBLICATIONS

Egorov et al., "Bicylindrical Indentor for Measuring Microhardness", Ind. Lab. (USA), vol. 44, No. 12, (Dec. 1978) (Publ Jun. 1979).

"Microfabrication of Cantilever Styli for the Atomic Force Microscope"; J. Vac. Sci. Technol. A8(4), Jul.-/Aug. 1990; pp. 3386–3396.

Surface Studies by Scanning Tunneling Microscopy By G. Binning, H. Rohrer, Ch. Gerber, and E. Weibel, Physical Review Letters, vol. 49, (1982), pp. 57 ∝ 60.

Atomic Resolution with the Atomic Force Microscope on Conductors and Nonconductors, By Thomas R. Albrecht, et al, J. Vac Sci. Technol. A6 (2), 1988 pp. 271–274.

Advances in Atomic Force Microscopy, T. R. Albrecht, et al, STM '89 Poster Session.

*Primary Examiner*—Robert Raevis
*Attorney, Agent, or Firm*—Frishauf, Holtz, Goodman & Woodward

[57] ABSTRACT

A cantilever for a scanning probe microscope comprises a lever section and a probe section disposed near the free end thereof. The probe section includes a conical distal end portion having a narrow point angle and a bulging proximal end portion continuous with the distal end portion. The cantilever is manufactured by utilizing a semiconductor process.

3 Claims, 11 Drawing Sheets

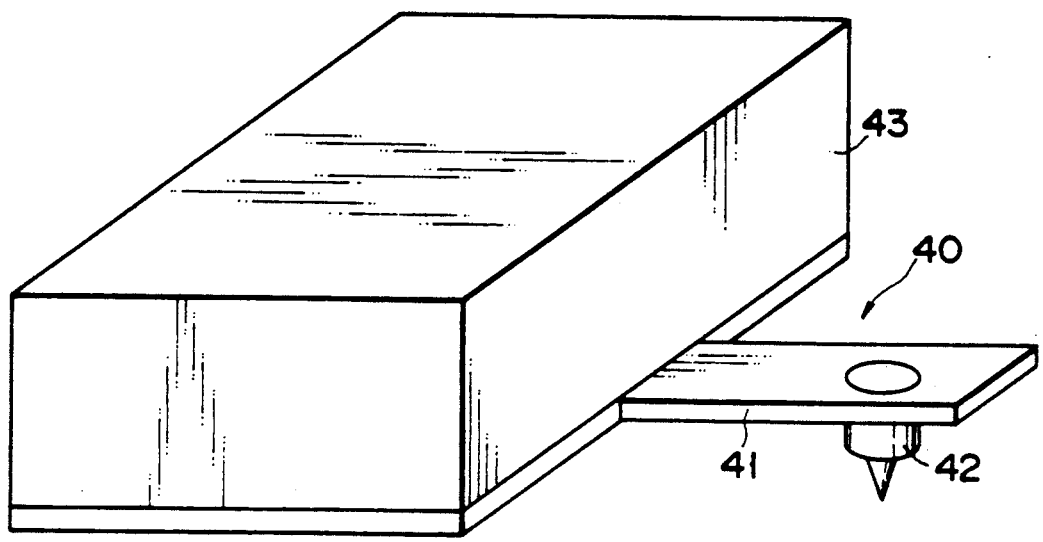
F I G. 3
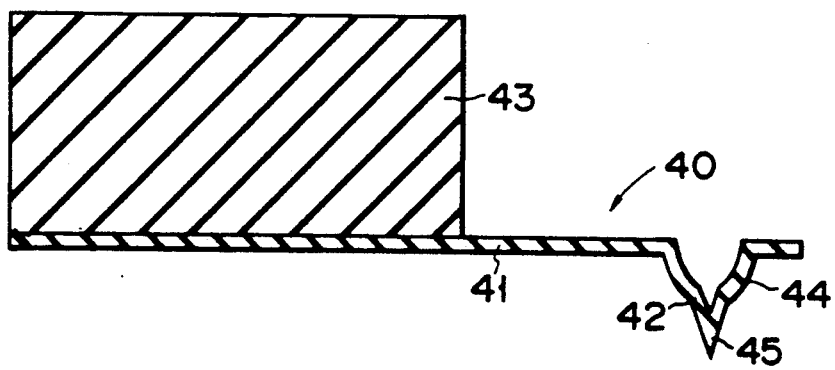
F I G. 4

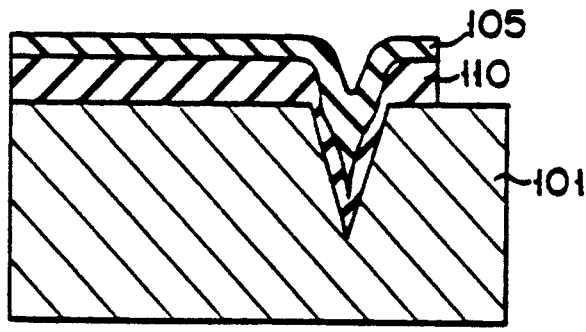
F I G. 8E
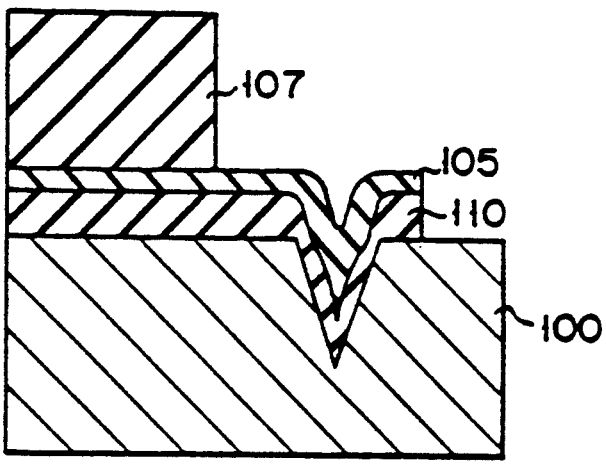
F I G. 8F
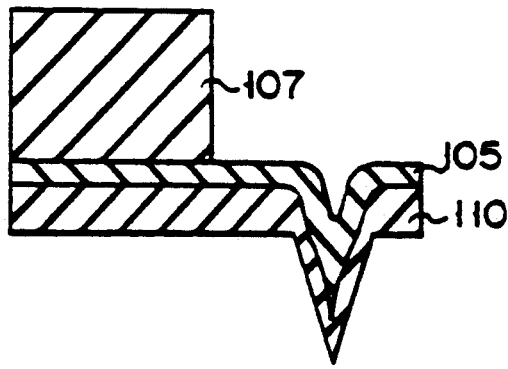
F I G. 8G
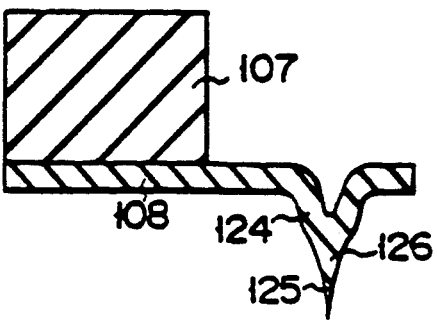
F I G. 8H

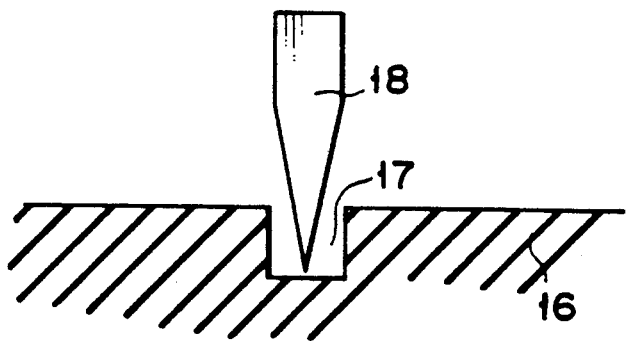
F I G. 14

CANTILEVER FOR A SCANNING PROBE MICROSCOPE AND A METHOD OF MANUFACTURING THE SAME

BACKGROUND OF THE INVENTION

1. Field of the Invention

The present invention relates to a cantilever for a scanning probe microscope, and more particularly, to a structure of and a manufacturing method for the cantilever of this type which comprises a lever section and a probe section disposed near the free end thereof.

2. Description of the Related Art

A scanning tunneling microscope (STM), which had been invented by G. Binning, H. Rohrer, Ch. Gerber, and E. Weibel (Surface Studies by Scanning Tunneling Microscope, Phys. Rev. Lett., 49 (1982) 57), has been used in a wide variety of fields, serving as a microscope through which atomic-order indentations of a surface can be observed.

Meanwhile, an atomic force microscope (AFM) was proposed as a further developed version of the STM (Published Unexamined Japanese Patent Application No. 62-130302; Method and Apparatus for Forming Image of Sample Surface by G. Binning, IBM). With use of the AFM, an insulating sample, which has not been able to be measured by means of the STM, can be observed with an accuracy of atomic orders, utilizing elemental technology including servo technology. FIG. 15 shows an example of the AFM disclosed in the patent application mentioned above. The AFM resembles the STM in structure.

In FIG. 15, a cantilever 11 having a sharp projection (first probe section 13) at its tip end is disposed opposite and close to a sample 9. As the distal end of the probe section 13 brought close to the sample, its atoms and the atoms of the sample interact with one another, thus producing a force proportional to the distance between the section 13 and the sample. If the sample and the probe section are relatively scanned in the XY direction in this state, a lever section 12 shifts its position depending on the irregularity of the sample surface. Thus, an insulating sample, which has not been able to be measured by means of the STM, can be measured indirectly by determining the displacement of the lever section with use of an AFM system which includes a second probe section 14 located on the opposite side of the cantilever 11 to the sample 9.

In an FM (force microscope) typified by the AFM described above, the shape of the probe section, for use as its sensor element, is a very important factor, since it may greatly influence resolutions in the X, Y, and Z directions or restrict the types of measurable samples.

Conventional cantilevers are manufactured by sharpening an end of a thin metal wire by mechanical or electropolishing, and if necessary, bending the wire into the shape of an L, or by bonding a diamond piece, for use as a probe section, to a leaf of metal or the like.

According to the FM with one such cantilever, however, it is difficult to manufacture the lever section of the cantilever with high accuracy, and the measurement conditions inevitably vary when the cantilever, an expendable, is replaced with a new one. The mechanical resonance frequency of the cantilever depends on its length, so that the replacing cantilever should have the same resonance characteristic and the same high-accuracy length as the replaced one. According to the method described above, however, such high-accuracy cantilevers cannot be obtained with ease. For higher resistance to external vibration, moreover, a shorter lever section is preferred because it can ensure a higher resonance frequency. According to the aforementioned method, however, it is also difficult to form a short lever section.

T. R. Albrecht et al. reported a novel cantilever which has a pyramid-shaped probe section (Thomas R. Albrecht, Shinya Akamine, Marco Tortonese, and Calvin F. Quate; Advances in Atomic Force Microscopy, STM '89 Poster Session). This pyramid-shaped probe section is manufactured by subjecting a lattice plane having a Miller index (100) of a silicon wafer to wet anisotropic etching to form a pyramid-shaped hole, forming an $Si_3N_4$ film on the resulting structure, and then etching the structure into the form of a lever. This microcantilever, which is manufactured using the same processes for the manufacture of a semiconductor IC, can enjoy high accuracy of $\mu m$ orders and very high reproducibility. However, even this method cannot always provide a satisfactory probe section.

The point angle of the probe section restricts the types of measurable samples. Accordingly, a sample 16 having a hole or groove 17 which is so deep that the tip end of a probe section 15 cannot reach the bottom of the hole 17, as shown in FIG. 12, cannot produce a reliable output signal, as shown in FIG. 13, so that its measurement is impossible. Also, a steep stepped structure will become as dull as the probe angle. As shown in FIG. 14, therefore, the point angle of the probe section 18 should be as narrow as possible. Since a pyramid-shaped probe section is formed as a replica of an etching pit in silicon, however, its individual faces cross at angles of 72° to one another, corresponding to the crystal structure of silicon. The maximum possible angle formed between any two of four edges which extend As compared with a point angle of 30° or less for an electropolished probe used in the STM, the point angle of the pyramid-shaped probe section is so wide that it is difficult to measure samples having deep holes or grooves. Thus, the shape of a pyramid has never been regarded as a desired shape for the probe section.

Accordingly, the cantilever has been expected to be manufactured with high accuracy by utilizing the semiconductor process as aforesaid, and to have a probe section with a narrow point angle.

The point angle mentioned herein is the angle 8 of the distal end portion of a probe section 19, and is different from the radius R, as shown in FIG. 16.

Further, T. R. Albrecht et al. reported a cantilever which has a probe section with a narrow point angle (Thomas R. Albrecht and Calvin F. Quate; Atomic resolution with the atomic force microscope on conductors and nonconductors, J. Vac. Sci. Technol. A6(2), (1988) 271). In this case, however, the probe section is not long enough to be a satisfactory one. Thus, there is a demand for a cantilever having a longer probe.

If the probe section of the cantilever is not long enough, the cantilever must be inclined with respect to the surface of a sample when it is mounted on the FM to be used for measurement, in order to prevent the sample from touching the other portion of the cantilever than the probe section. Therefore, the design and manufacture of the FM are difficult or troublesome. This is a critical problem, in particular, for an FM which is designed to measure the displacement of the cantilever optically. If the cantilever is inclined, moreover, the motion of the probe section involves the motions of components in other directions than the one perpendicular to the sample surface. Therefore, the irregularity of the sample surface cannot always be ideally detected, so that the resolution is low. Thus, there is a demand for the development of a longer probe section with a sharp tip configuration, as well as for solutions to the aforementioned problems.

Since cantilevers are regarded as expendables, furthermore, they are expected to be manufactured with reliability and at low cost.

SUMMARY OF THE INVENTION

The present invention has been contrived in consideration of these circumstances, and its object is to provide a cantilever having a probe section with a sharp tip configuration and a moderate probe length, and a method for manufacturing the same with reliability.

More specifically, the invention is intended to manufacture a cantilever having a high-accuracy probe section by utilizing a semiconductor process.

Further, the invention is intended to manufacture a probe section with a nearly ideal shape by separately forming a plurality of parts thereof between which its functions are divided.

Preferably, a probe of the invention is formed on a cantilever with a length of 1 mm or less, especially 500 $\mu$m or less.

According to a first aspect of the present invention, there is provided a cantilever for a scanning probe microscope, which comprises a lever section and a probe section disposed near the free end of the lever section, the probe section including a distal end portion having a narrow point angle and a bulging proximal end portion continuous with the distal end portion.

According to a second aspect of the invention, there is provided a method of manufacturing a cantilever for a scanning probe microscope which comprises a lever section and a probe section disposed near the free end thereof, the method comprising the steps of: forming a replica hole for the probe section in a semiconductor substrate by etching; depositing a basic material for the lever section and the probe section in a region on the substrate including the replica hole; patterning the basic material into a predetermined shape; and removing the substrate.

According to a third aspect of the invention, there is provided a method of manufacturing a cantilever for a scanning probe microscope which comprises a lever section and a probe section disposed near the free end thereof, the probe section including a distal end portion having a narrow point angle and a bulging proximal end portion continuous with the distal end portion, the method comprising the steps of: forming a replica hole for the probe section in a semiconductor substrate by etching, the replica hole including a first portion corresponding to the proximal end portion of the probe section and a second portion corresponding to the distal end portion of the probe section; depositing a basic material for the lever section and the probe section in a region on the substrate including the replica hole; patterning the basic material into a predetermined shape; and removing the substrate Preferably, the substrate is a silicon substrate, and the cantilever is formed of $Si_3N_4$. Moreover, the method may further comprise a process for bonding a support member for supporting the lever section to the lever section before the step of removing the substrate.

According to the present invention, the tip end of the probe section can be thinned so that the probe section (distal end portion) can enjoy a high aspect ratio. In an FM using the cantilever having the probe section according to the invention, the shape of a sample can be reproduced more faithfully.

The cantilever having the probe section whose functions are divided between the distal end portion and the proximal end portion can ensure the mounting strength and the substantial length of the whole probe section, so that the life of the cantilever can be lengthened. If the cantilever is applied to the FM, moreover, it can be mounted substantially horizontally, so that the measurement resolution can be restrained from lowering.

The cantilever of the present invention is not limited to use in the FM, and may be also effectively applied to a scanning probe microscope which, deriving from an STM and called an SXM, has a resolution of automic orders.

Furthermore, the invention may be applied to the manufacture of emitters of electron microscopes, emitter regions of recently developed vacuum microelectronic devices, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a perspective view of a cantilever according to a second embodiment of the invention;

FIG. 4 is a sectional view of the cantilever according to the second embodiment;

FIGS. 8A to 8H are sectional views successively showing steps for manufacturing a cantilever according to a fifth embodiment of the invention;

FIG. 14 is a sectional view for illustrating the shape reproducibility of a probe with a narrow point angle;

DETAILED DESCRIPTION OF THE PREFERRED EMBODIMENTS

Figure 1:
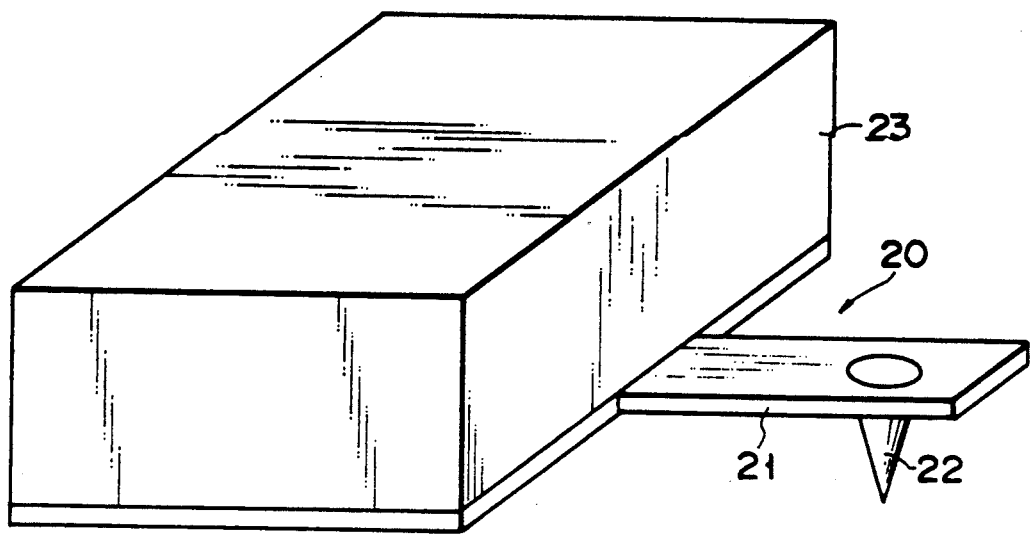
FIG. 1 is a perspective view of a cantilever according to a first embodiment of the present invention.

FIG. 1 is a perspective view of a cantilever according to a first embodiment of the present invention. The cantilever 20 comprises a lever section 21 and a probe section 22, and the proximal portion of the section 21 is supported on a support member 23.

Figure 2A:
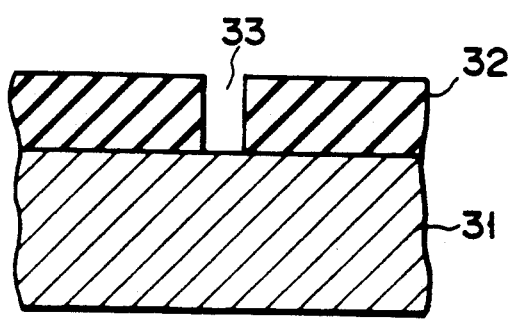
FIGS. 2A to 2G are sectional views successively showing steps for manufacturing the cantilever of FIG. 1.
Figure 2B:
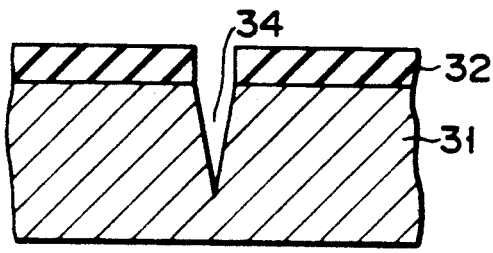
Figure 2C:
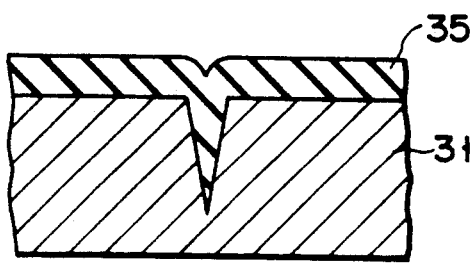
Figure 2D:
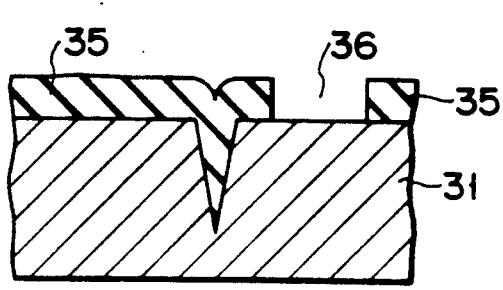
Figure 2E:
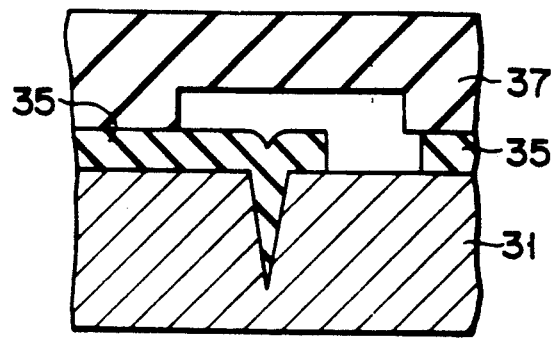
Figure 2F:
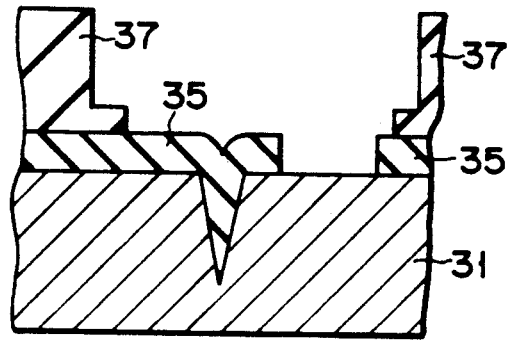
Figure 2G:
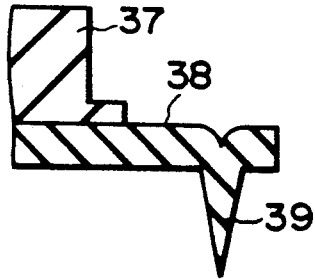

The cantilever 20 is manufactured in steps shown in FIGS. 2A to 2G. The details of these manufacturing steps will be described in connection with Example 1 mentioned later. In brief, a hole 34 is bored in a silicon wafer 31 by etching (FIGS. 2A and 2B), and an $Si_3N_4$ film 35 is formed on the wafer 31 (FIG. 2C) and patterned in the form of a cantilever (FIG. 2E). A support member 37, which finally constitutes a pedestal of the lever, is bonded to the resulting structure (FIG. 2E), the member 37 is processed (FIG. 2F), and the silicon wafer 31, used as a mask for the manufacture of the probe section, is melted away (FIG. 2G). Thereupon, the cantilever of the present invention is completed.

A method for manufacturing a cantilever according to the present invention is characterized by the process for manufacturing the probe section. In the present invention, the silicon wafer 31 is etched to be used as the mask for the manufacture of the probe section. This etching is dry etching which requires use of a plasma etching apparatus. The hole 34 formed by the dry etching process according to the invention can enjoy a much sharper shape than one formed by the wet etching process using a water solution of KOH or EPW (ethylene-diamine-pyrocatechol-water), which is conventionally proposed by T. R. Albrecht et al. Thus, a probe section 39 of the resulting cantilever is substantially in the shape of an elongated cone having a very narrow point angle. In other words, the ratio of length to diameter (aspect ratio) in the probe configuration is high. An AFM measurement using the cantilever having the sharp probe section 39 according to the present invention can more accurately determine, and reproduce the shape of a sample having sharp step portions.

FIGS. 3 and 4 are a perspective view and a sectional view, respectively, of a cantilever according to a second embodiment of the present invention. The cantilever 40 comprises a lever section 41, a probe section 42, and a support member 43. In general, the cantilever of this embodiment is constructed in the same manner as the one according to the first embodiment. In the second embodiment, however, the probe section is composed of two divisions, a distal end portion 45 and a proximal end portion 44 which constitutes the joint to the lever section.

The cantilever 40 is manufactured in steps shown in FIGS. 5A to 5H. The details of these manufacturing steps will be described in connection with Example 2 mentioned later.

In this embodiment, the proximal end portion 44 at the root of the probe section 42 is formed-expanded without changing the sharp configuration of the portion 45, in order to make the whole probe section relatively long. In the cantilever 40 with a long probe according to the present invention constructed in this manner, the distance between the cantilever surface and the FM (sum of the respective lengths of the portions 44 and 45) can be increased by the length of the proximal end portion 44, even though the cantilever surface is held parallel to the sample when the cantilever is mounted on the FM. During the measurement with the cantilever on the AFM, therefore, there is no possibility of projections of the sample interfering with the cantilever. Accordingly, the cantilever need not or must only be inclined at a narrow angle to the sample surface when it is mounted on the AFM. Thus, the design of the FM can be simplified, and at the same time, the measurement resolution can be improved.

It may be said that the functions of the probe section constructed in this manner are divided among a plurality of portions. In the conventional cantilever, the functions are divided only between the lever section and the probe section. More specifically, the lever section may be formed of $Si_3N_4$, while the probe section may be made of metal material such as tungsten, for example. If the cantilever is intended for use in a magnetic force microscope (MFM), the probe section may be formed of nickel or the like so that it is sensitive to magnetic force.

In the cantilever 40 of the second embodiment, on the other hand, the functions of the probe section are divided further. Apparently, moreover, the probe section is composed of the distal end portion 45, which interacts with the sample surface, and the proximal end portion 44 which connects the probe section 42 and the lever section 41 and also serves to lengthen the probe. Thus, the individual functions are suitably reflected in the respective shapes of their corresponding portions of the probe section, so that the cantilever of this embodiment can fulfill its functions better than the conventional cantilever.

According to the present invention, as described above the aspect ratio of the probe section be increased by making its root much thicker than its tip. In the FM using the cantilever with the probe section according to the present invention, the probe section has an additional mechanical strength to counter a lateral external force applied thereto in some cases, for example, when it is brought into contact with the sample to effect scanning Thus, the FM can more faithfully reproduce the sample shape.

With use of the cantilever having the probe section whose functions are divided between the distal end portion and the proximal end portion, the tip of the probe section can be thinned so that the sample shape can be faithfully reproduced, and the proximal end portion can ensure the mounting strength and the substantial length of the whole probe section, so that the life of the cantilever can be lengthened. If the cantilever is applied to the FM, moreover, it can be mounted substantially horizontally, so that the measurement resolution can be restrained from lowering.

Basically, those film forming materials used in a semiconductor process, such as $SiO_2$ and metals, as well as $Si_3N_4$, may be used as materials for the cantilever, depending on the adaptability to the manufacturing process. If the etching ratio of the material of the cantilever compared with silicon is not high enough, it is inevitably etched when silicon is etched in the final process. If such a material is used, the cantilever should be prevented from being affected by the etching of silicon by, for example, providing an intermediate layer between the layer of the cantilever material and silicon. The cantilever of the present invention is not, however, restricted in definition by its material The support member for the cantilever may be formed of glass, ceramics, plastics, metal, or silicon wafer. Since the scanning probe microscope combined with the cantilever is an apparatus which deals with sizes of atomic orders, in particular, data may possibly be influenced by thermal expansion of its small parts. Therefore, a material having a small coefficient of thermal expansion, as well as high rigidity, is selected for the support member For example, the support member and the cantilever may be bonded together by means of an adhesive agent or by the anodic bonding method in which voltage is applied to the two members at high temperature after the bonding surfaces are cleared of soil. The present invention is not, however, limited to these bonding methods.

Alternatively, moreover, the cantilever may be metalized with gold for electrical conductivity o coated for higher reflectance, depending on the type of means for measuring the displacement of the cantilever in the AFM or other apparatus. The present invention is not limited to these treatments.

EXAMPLE 1

An example of the cantilever according to the first embodiment of the present invention shown in FIG. 1 was manufactured in steps shown in FIGS. 2A to 2G.

First, the silicon wafer 31 with a (100) plane surface was washed, and an $SiO_2$ film 32 was deposited to a thickness of 1 $\mu$m on the wafer 31 by thermal oxidation. Then, the wafer 31 was coated with a resist, and was exposed with a probe section pattern for dry etching by means of a mask aligner (FIG. 2A). A hole 33 formed by this patterning forms a circle of 1.4 $\mu$m diameter. After a developing treatment was executed, the silicon wafer 31 was etched with use of the etched $SiO_2$ film as a mask (FIG. 2B). In this etching, which is anisotropic plasma etching, $CCl_4$-plus-$O_2$ gas was used as an etching gas. As a result, a hole 34 with an on-surface diameter of 1.4 $\mu$m and a depth of 3 $\mu$m was formed in the silicon wafer 31.

Thereafter, the $SiO_2$ film 32 was removed by using buffered hydrofluoric acid, and the $Si_3N_4$ film 35 was deposited to a thickness of 300 nm by low-pressure chemical vapor deposition (LPCVD) (FIG. 2C). Further, the resulting structure was annealed in water vapor at 1,100° C., the $Si_3N_4$ film 35 was treated with a small quantity of $SiO_2$, and the resist was applied again for coating. Then, the structure was exposed with a pattern by means of a mask aligner so that the cantilever length was 100 $\mu$m, and the $Si_3N_4$ film was etched by means of $CF_4$-plus-$O_2$ plasma, whereby a pattern 36 was obtained (FIG. 2D). A pyrex glass 37 (Corning #7740) of 1-mm thickness to constitute the cantilever support member was joined to the structure by anodic bonding (FIG. 2E), and an unnecessary portion of the glass 37 was cut off (FIG. 2F). Finally, the whole silicon wafer 31 was etched away with use of hydrofluoric acid plus nitric acid plus acetic acid, except that portion of the $Si_3N_4$ film which was to constitute the cantilever (including a lever section 38 and a probe section 39) (FIG. 2G).

The probe section 39 of the cantilever of the present invention manufactured in this manner was substantially conical in shape, reflecting the shape of the hole 34 formed by anisotropic plasma etching. The root of the probe section 39, on the lever section side of the cantilever, measured 1.5 $\mu$m in diameter, and the length of the section 39 was 2.5 $\mu$m.

The resulting probe had a point angle much narrower than that of a comparative example mentioned later, although the probe section 39 has substantially the same length as in the comparative example.

EXAMPLE 2

An example of the cantilever according to the second embodiment of the present invention shown in FIG. 3 was manufactured in steps shown in FIGS. 5A to 5H.

First, phosphorus was diffused into the surface of a silicon wafer 51 which resembles the one used in Example 1 (FIG. 5A), thereby forming a phosphorus diffusion layer 52. Then, an $SiO_2$ film 53 was formed by thermal diffusion (FIG. 5B), and thereafter, a circular probe pattern hole 55 of 1.4 $\mu$m diameter was bored in the $SiO_2$ film 53 with use of a resist 54 (FIG. 5C).

Figure 5A:
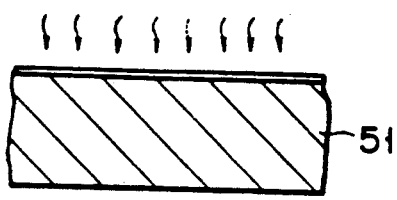
FIGS. 5A to 5H are sectional views successively showing steps for manufacturing the cantilever of FIG. 3
Figure 5E:
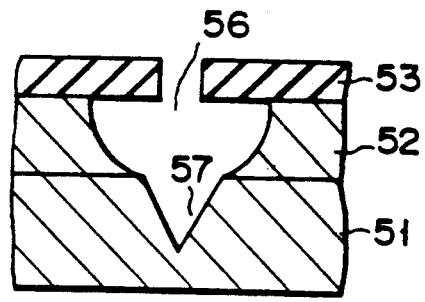
Figure 5B:
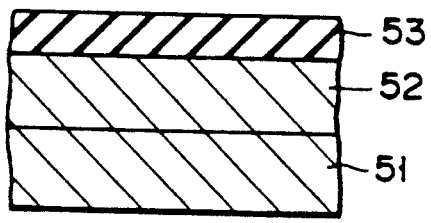
Figure 5F:
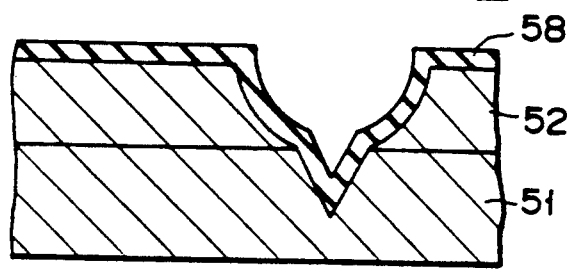
Figure 5C:
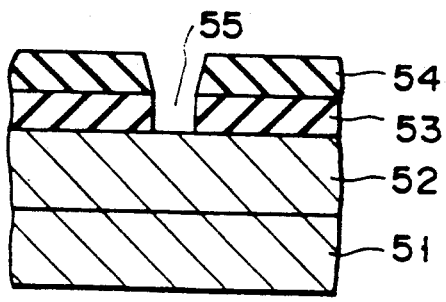
Figure 5G:
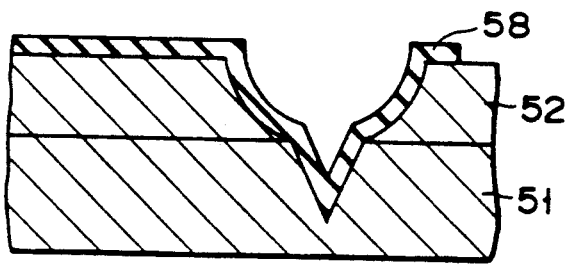
Figure 5D:
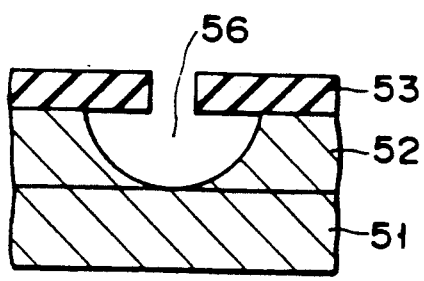

Thereafter, the resulting structure was subjected to isotropic etching using hydrofluoric acid plus nitric acid plus acetic acid, and the phosphorus diffusion layer 52 was scooped under the mask of the $SiO_2$ film 53, whereby a hemispherical portion 56 with a radius of about 1.5 $\mu$m was formed (FIG. 5D).

Figure 5H:
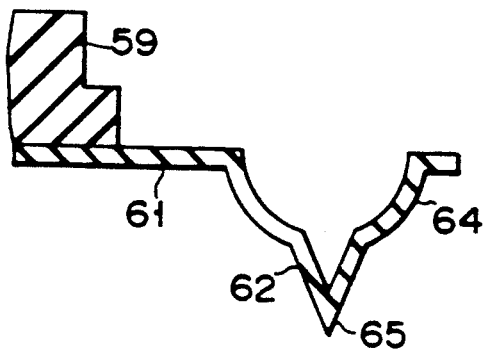

Subsequently, after a hole 57 was formed in the silicon wafer 51 by anisotropic plasma etching using $CCl_4$-plus-$O_2$ gas (FIG. 5E) in the same manner as in Example 1, an $Si_3N_4$ film 58 was deposited (FIG. 5F). Then, the $Si_3N_4$ film 58 was etched for patterning (FIG. 5G). After a pyrex glass 59 was bonded to the resulting structure, the silicon wafer 51 was removed by etching (FIG. 5H). Thus obtained was the cantilever of the present invention which comprises a lever section 61 and a probe section 62.

In the cantilever manufactured in this manner, the probe section 62 included a hemispherical proximal end portion 64 and a distal end portion 65 which, like the one formed in Example 1, had the shape of an elongated cone formed on the extreme end of the portion 64. The diameter of the hemisphere of the proximal end portion 63 was 4 $\mu$m, and that of the base of the conical portion 65 was 1.8 $\mu$m. The portion 65 measured 2.5 $\mu$m in length. The overall length of the probe section 62 combining the proximal and distal end portions 64 and 65 was 4.6 $\mu$m. Thus, the probe section of the cantilever according to this embodiment was sharper than that of the cantilever of the comparative example mentioned later, and its overall length was longer than in the case of Example 1.

The point angle of the conical distal end portion of the hole 57 in the wafer was somewhat wider than in the case of Example 1, despite the same conditions used in the same steps as in Example 1, such as anisotropic plasma etching. Thus, when $Si_3N_4$ was deposited thereafter, cracks or the like occurred less frequently at the boundary between the hemispherical and conical portions 64 and 65 than in Example 1.

EXAMPLE 3

The $SiO_2$ film 53 of Example 2 was formed with a 4 $\mu$m square pattern in place of the circular probe pattern of 1.4 $\mu$m diameter, and the silicon wafer 51 (phosphorus diffusion layer 52) was scooped by anisotropic etching using a water solution of KOH. Since there is a great difference in etching rate between a (111) plane and a (100) plane, the trace of etching was in the shape of an inverted pyramid, whose edges extended at right angles to one another. Then, SiO$_2$ was deposited by sputtering, a resist was applied for coating, the resulting structure was exposed to a circular probe pattern of 1.4 μm diameter, and a conical hole was bored by anisotropic plasma etching.

Figure 6:
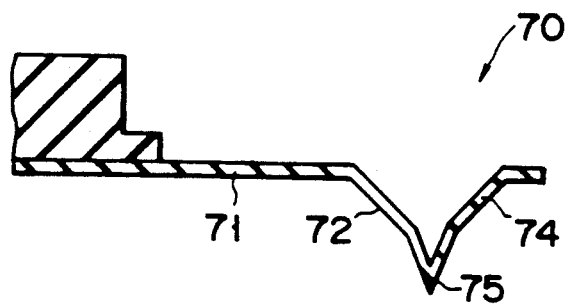
FIG. 6 is a perspective view of a cantilever according to a third embodiment of the invention.

Thereafter, the SiO$_2$ film was removed, and the deposition of Si$_3$N$_4$ and its subsequent steps were executed in the same manner as in Examples 1 and 2, whereupon a cantilever 70 according to a third embodiment of the present invention was obtained, comprising a lever section 71 and a probe section 72, as shown in FIG. 6.

The probe section 72 of the cantilever 70 manufactured in this manner, like that of the cantilever of Example 2, included a proximal end portion 74 and a distal end portion 75, between which the functions of the probe section were divided. Unlike the one in Example 2, the proximal end portion 74 was pyramid-shaped. Since the pyramid-shaped portion was formed in the same process as in the comparative example mentioned later, the overall length of the probe section is greater, and the point angle is narrower than in the comparative example.

EXAMPLE 4

A cantilever according to a fourth embodiment of the present invention was obtained by replacing the steps required before the formation of the hole 34 in the silicon wafer 31, in the middle of the manufacture of the cantilever of Example 1, with steps shown in FIGS. 7A to 7G, in order to sharpen the hole 34.

Figure 7A:
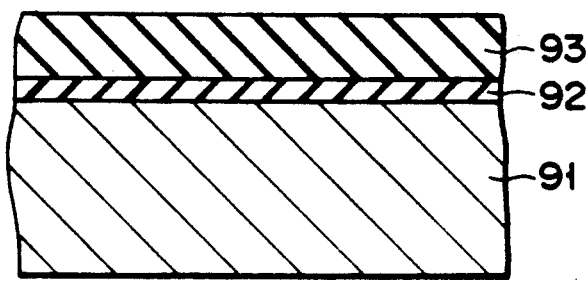
FIGS. 7A to 7I are sectional and perspective views successively showing steps for manufacturing a cantilever according to a fourth embodiment of the invention.
Figure 7B:
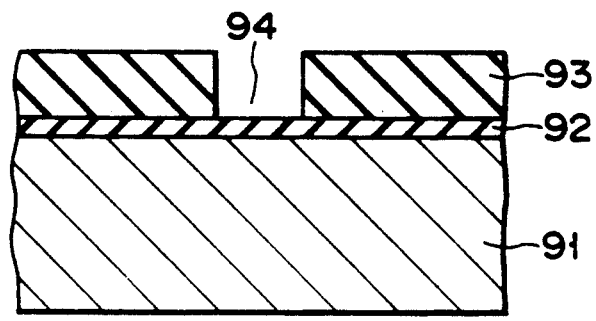
Figure 7C:
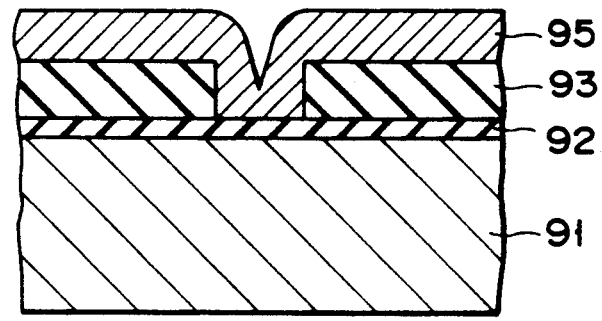
Figure 7D:
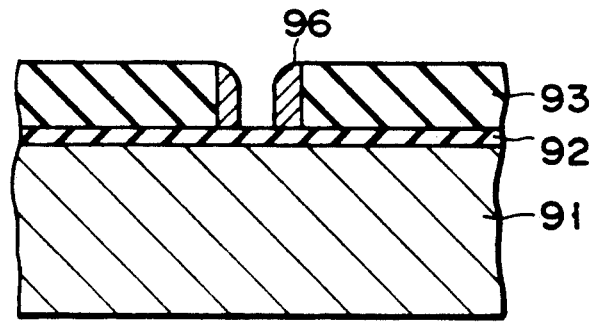
Figure 7E:
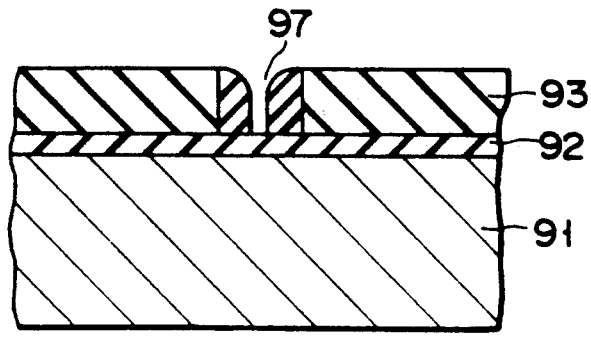
Figure 7F:
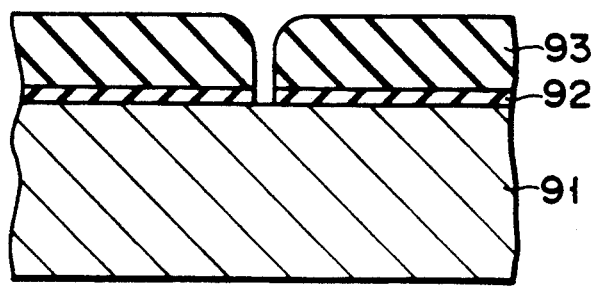
Figure 7G:
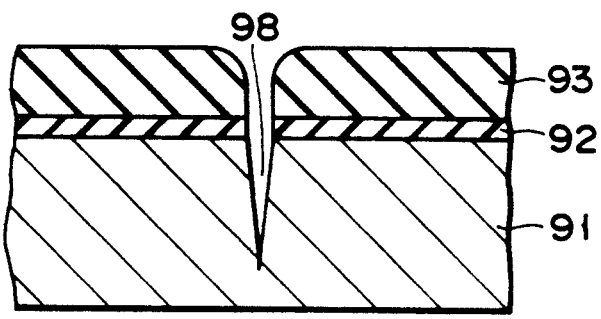
Figure 7H:
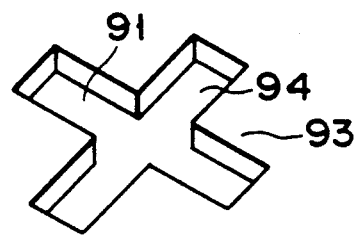
Figure 7I:
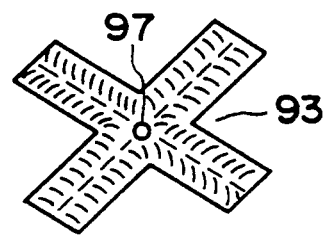

First, an Si$_3$N$_4$ film 92 and an SiO$_2$ film 93 were formed on a silicon wafer 91 (FIG. 7A), and a cross-shaped pattern 94 was formed by dry etching (FIGS. 7B and 7H). Then, a polycrystalline silicon film 95 was deposited (FIG. 7C) and then etched back to form a side wall 96 of polycrystalline silicon (FIG. 7D). The resulting structure was then subjected to thermal oxidation so that the pattern 94 was reduced in size as silicon changed swelling into SiO$_2$, leaving only a fine hole 97 in the center of the cross (FIGS. 7E and 7I). The Si$_3$N$_4$ film 92 and the silicon wafer 91 were dry-etched using the SiO$_2$ film as a mask, whereupon a very sharp, elongated replica hole 98 was formed (FIGS. 7F and 7G).

After these steps, the SiO$_2$ and Si$_3$N$_4$ films were removed, and the cantilever according to the present invention was manufactured following the steps of procedure of Example 1.

EXAMPLE 5

Figure 8A:
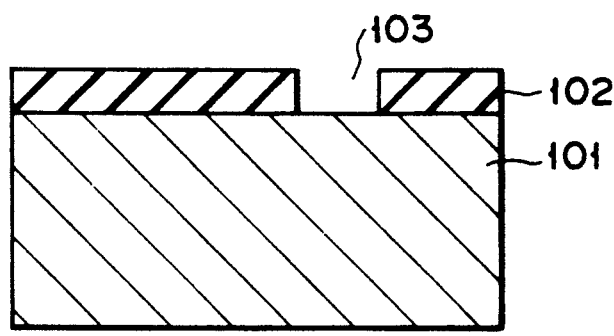
Figure 8B:
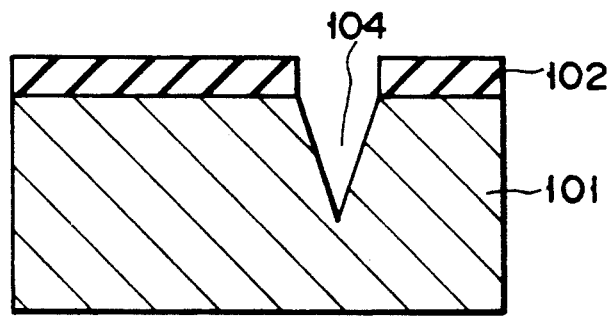

A silicon wafer 101 with a (100) plane surface similar to the one used in Example 1 was washed, and an SiO$_2$ film 102 was deposited to a thickness of 750 nm on the wafer in a thermal oxidation oven. Then, the SiO$_2$ film 102 was patterned by photolithography to form a hole 103 (FIG. 8A). A hole 104 was formed in the silicon wafer 101 by reactive ion etching (RIE) with use of the SiO$_2$ film as a mask (FIG. 8B). At this time, the wafer was subjected to 50 minutes of dry etching in a vacuum of 4.5 Pa and at 450 W, using CCl$_4$ (100 sccm) gas.

Figure 8C:
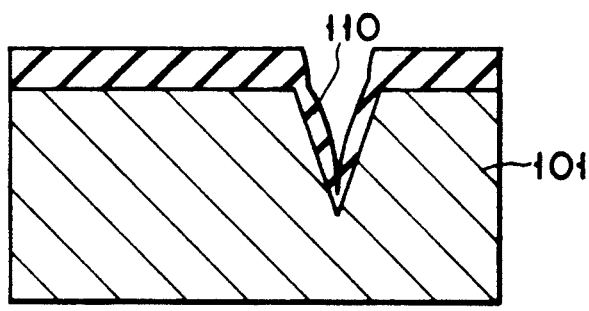

Thereafter, the resulting structure was subjected to 100 minutes of wet oxidation at 900° C. in the thermal oxidation oven (FIG. 8C). Although the thickness of a silicon oxide film 110 adhering to the hole 104 was not able to be measured, an oxide film thickness measured on another silicon wafer, put as a monitor in the thermal oxidation oven, was 170 nm.

Figure 8D:
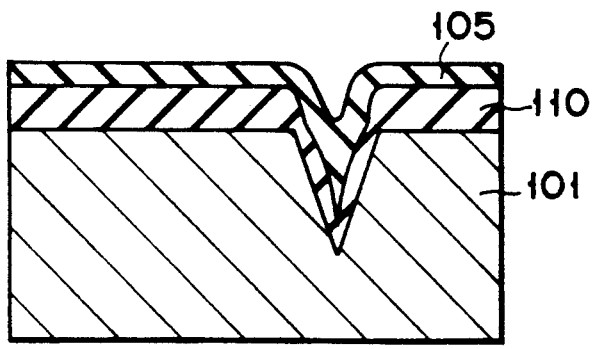

Then, an Si$_3$N$_4$ film 105 was deposited to a thickness of 400 nm at 0.3 Torr and 785° C. for 90 minutes, by LPCVD using SiH$_2$Cl$_2$-plus-NH$_3$ gas (FIG. 8D). Further, the film 105 was annealed in water vapor of 1,100° C. and then patterned for a cantilever shape by photolithography (FIG. 8E).

As in the cases of the other examples and the comparative example, thereafter, a pyrex glass 107 (Corning #7740) to constitute a support member for a cantilever was joined to the resulting structure by anodic bonding (FIG. 8F), and an unnecessary portion of the glass 107 was cut off.

Subsequently, the silicon wafer 101 was removed from the inside by etching using a water solution of KOH (FIG. 8G), and also, the oxide film 110 was removed by using hydrofluoric acid (FIG. 8H). Thus, a cantilever according to a fifth embodiment of the present invention was completed, comprising a lever section 108 and a conical probe section 109.

According to this method, when the SiO$_2$ film is formed on the inner wall of the hole by thermal oxidation, the inside of the distal end portion of the hole is further sharpened as silicon changes swelling into SiO$_2$. As a result, a distal end portion 125 of a probe section formed with use of this hole as a replica can be made much sharper than a proximal end portion 124 because an intermediate portion 126 is constricted.

Thus, the resulting probe section 109 can enjoy a point angle narrower than that of Example 1, as well as the same length.

EXAMPLE 6

A hole having the shape of an inverted pyramid was bored in a silicon wafer by wet anisotropic etching using a water solution of KOH in place of anisotropic plasma etching in Example 5.

Figure 9:
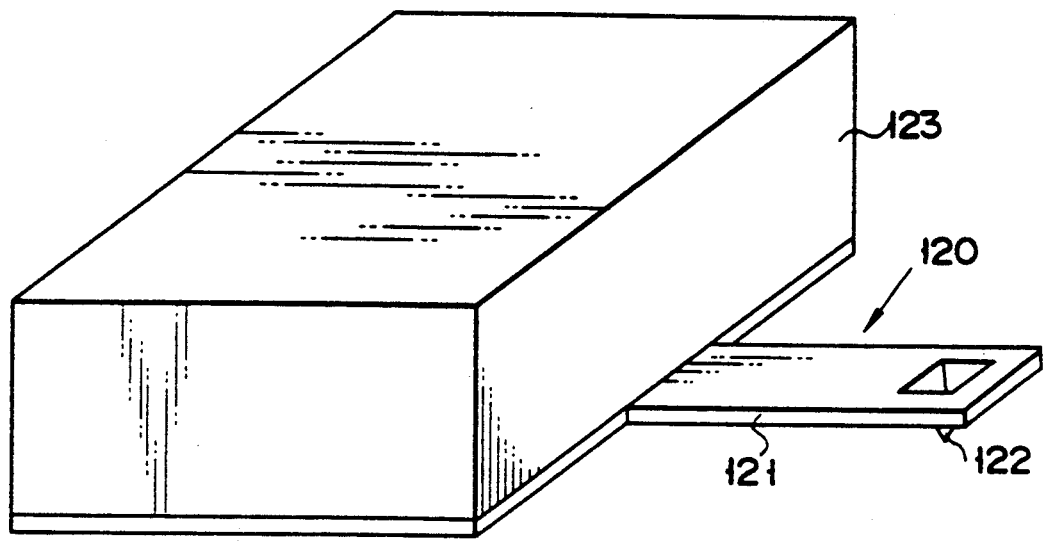
FIG. 9 is a perspective view of a cantilever according to a sixth embodiment of the invention.

Thereafter, the wafer was put into the thermal oxidation oven to be subjected to 150 minutes of wet oxidation at 920° C., and Si$_3$N$_4$ was deposited by LPCVD. Thereupon, a cantilever 120 according to a sixth embodiment of the present invention, comprising a lever section 121, a probe section 122, and a glass support member 123, as shown in FIGS. 9 and 10, was obtained according to the same processes of Example 5.

Figure 10:
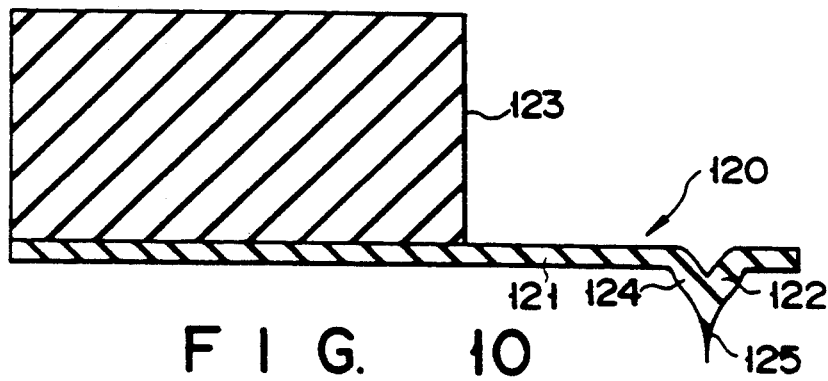
FIG. 10 is a sectional view of the cantilever according to the sixth embodiment.

According to this method, the tip shape of the probe section 122 was sharpened by the effect of the thermal oxidation process As shown in FIG. 10, moreover, the whole probe section was in the form of a pyramid whose flank was scooped away, and its distal portion enjoyed a substantially improved aspect ratio. Thus, the probe section 122 included a distal end portion 125 and a bulging proximal end portion 124 continuous therewith.

In this case, the hole in the silicon wafer had a wide opening, so that Si$_3$N$_4$ quite smoothly spreaded on the inner surface of the hole.

EXAMPLE 7

Figure 11:
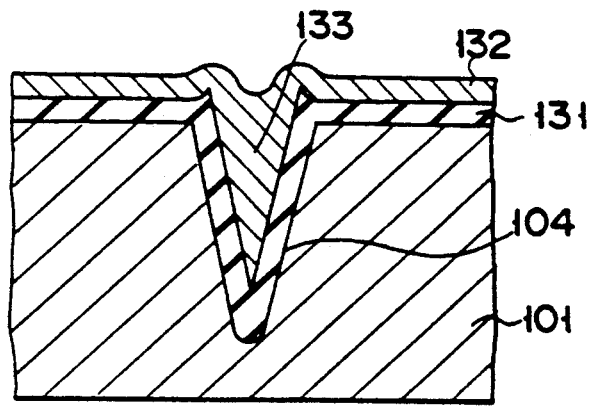
FIG. 11 is a sectional view for illustrating a process for manufacturing a cantilever according to a seventh embodiment of the invention.
Figure 12:
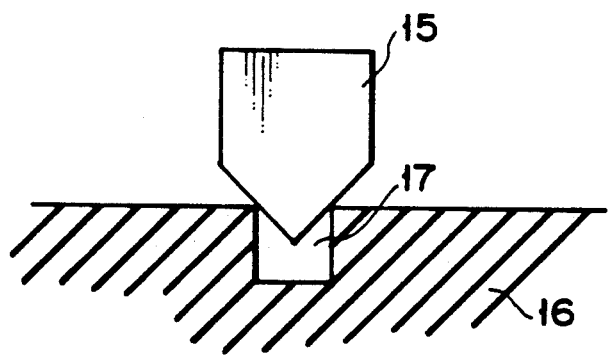
FIG. 12 is a sectional view for illustrating the shape reproducibility of a probe with a wide point angle.
Figure 13:
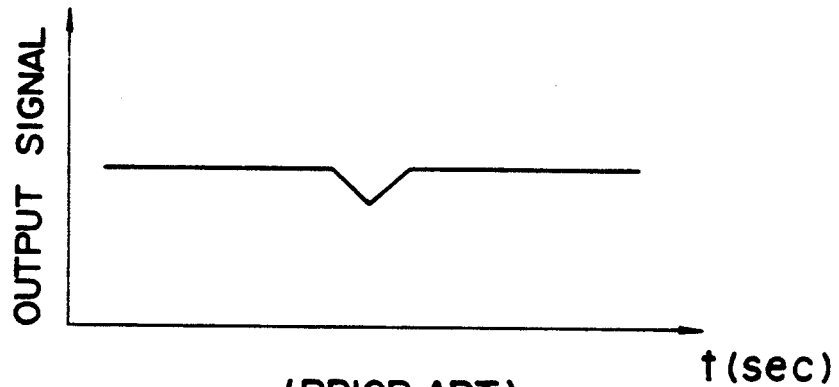
FIG. 13 is an output signal diagram for illustrating the shape reproducibility of the wide-angle probe.
Figure 15:
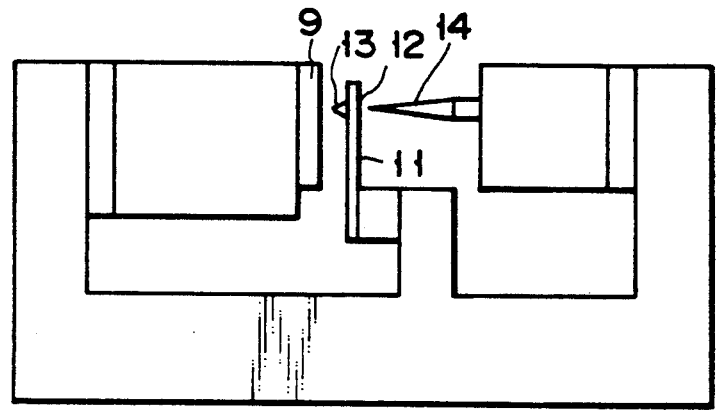
FIG. 15 is a schematic view of an atomic force microscope.
Figure 16:
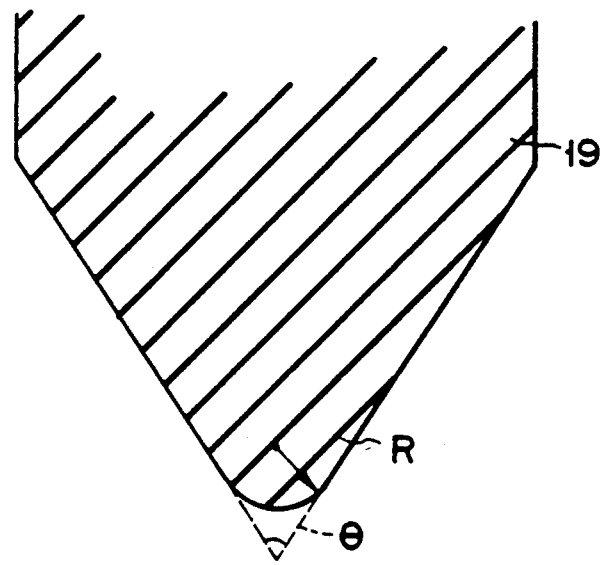
FIG. 16 is a diagram for illustrating the point angle.

After the hole 104 was bored in the silicon wafer 101 by anisotropic plasma etching, in manufacturing the cantilever of Example 5, an SiO$_2$ film 131 was formed on the inner wall of the hole by thermal oxidation, as shown in FIG. 11, and a polycrystalline silicon film 132 was then deposited by LPCVD. Polycrystalline silicon is better suited for hole stopping than Si$_3$N$_4$ or the like. While the Si$_3$N$_4$ film can only cover the inner wall of the hole, therefore, polycrystalline silicon can stop the hole. After a glass was bonded in the same manner as in Example 5, thereafter, the SiO$_2$ film 131 on the inner wall of the hole 104 was dissolved by using HF plus NH$_4$, whereupon a modification of the cantilever according to the present invention was obtained comprising a lever section and a probe section 133 of polycrystalline silicon.

If the cantilever is formed from the silicon film 132 by the CVD process, in this case, silicon can securely cover the inner surface of the hole for use as a replica, so that the cantilever can be manufactured with a satisfactory yield. If the cantilever is formed from Si$_3$N$_4$, on the other hand, Si$_3$N$_4$ sometimes fails to cover the whole inner surface of the replica hole, so that the probe section cannot enjoy a desired shape.

COMPARATIVE EXAMPLE

First, a silicon wafer with a (100) plane surface was washed, and an SiO$_2$ film was deposited to a thickness of 1 μm on a silicon wafer by thermal oxidation. Then, the wafer was coated with a resist, and was exposed with a probe section pattern for dry etching by means of a mask aligner. In this case, the pattern is a 4 μm square. After a developing treatment was executed, the silicon wafer was subjected to anisotropic etching in a water solution of KOH with use of the etched SiO$_2$ film as a mask. As a result, a hole having the shape of an inverted pyramid was formed in the silicon wafer.

Thereafter, the SiO$_2$ film was removed by using buffered hydrofluoric acid, and a Si$_3$N$_4$ film was deposited by LPCVD. Further, the resulting structure was annealed in water vapor at 1,100° C., the Si$_3$N$_4$ film was treated with a small quantity of SiO$_2$, and the resist was applied again for coating. Then, the structure was exposed with a cantilever pattern by means of a mask aligner, and the Si$_3$N$_4$ film was patterned by plasma etching. A pyrex glass was joined to the structure by anodic bonding, and the whole silicon wafer was finally etched away except that portion of the Si$_3$N$_4$ film which was to constitute the cantilever (including a probe section).

The probe section of the cantilever for comparison manufactured in this manner was substantially in the shape of a pyramid with edges extending at right angles to one another, reflecting the shape of the hole formed by anisotropic plasma etching in the water solution of KOH. The length of the probe section was 2.8 μm.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept a defined by the appended claims and their equivalents.

What is claimed is:

1. A cantilever for a scanning probe microscope, comprising:
   a lever section having a free end portion; and
   a probe section disposed at the free end portion of the lever section, said probe section including:
   a proximal portion and a distal portion which are integrally formed of a material,
   the proximal portion having:
      a first end connected to the free end portion of the lever section,
      a second end opposite to the first end thereof, and
      converging side surfaces extending from the first end to the second end;
   the distal portion having:
      a first end connected to the second end of the proximal portion,
      a second end opposite to the first end of the distal portion, the second end of the distal portion being shaped into a tip having a narrow point angle, and
      converging side surfaces extending from the first end of the distal portion to the second end of the distal portion; and
   convergent angles of the side surfaces of the proximal portion at the second end of the proximal portion are larger than convergent angles of the side surfaces of the distal portion at the first and second ends of the distal portion;
   wherein the cross-sectional shape of the second end of the proximal portion is substantially the same as the cross-sectional shape of the first end of the distal portion;
   wherein the convergent angles of the second end of the proximal portion change abruptly to the convergent angles of the first end of the distal portion;
   wherein the convergent angles of the second end of the proximal portion are smaller than 180°;
   wherein the proximal portion substantially has a shape selected from the group consisting of a truncated hemisphere, a truncated cone, and a truncated pyramid; and
   wherein the proximal and distal portions are made of a material containing silicon.

2. The cantilever according to claim 1, wherein said cantilever is made of Si$_3$N$_4$.

3. The cantilever according to claim 1, further including support means for supporting said lever section, said support means being made of glass.

* * * * *